(12) United States Patent
Sato (10) Patent No.: US 7,784,824 B2
(45) Date of Patent: Aug. 31, 2010

(54) MOUNTING STRUCTURE FOR AIRBAG APPARATUS

(75) Inventor: Hiroshi Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/039,945

(22) Filed: Feb. 29, 2008

(65) Prior Publication Data

US 2008/0211207 A1    Sep. 4, 2008

(30) Foreign Application Priority Data

Mar. 2, 2007  (JP)  ............................. 2007-052603
Mar. 2, 2007  (JP)  ............................. 2007-052605

(51) Int. Cl.
*B60R 21/21* (2006.01)

(52) U.S. Cl. ................................. 280/730.2; 280/728.2

(58) Field of Classification Search .............. 280/728.2, 280/730.2
See application file for complete search history.

(56) References Cited

U.S. PATENT DOCUMENTS

| | | | | |
|---|---|---|---|---|
| 7,384,063 | B2 * | 6/2008 | Riester et al. | ............ 280/730.2 |
| 7,490,851 | B2 * | 2/2009 | Riester et al. | ............ 280/730.2 |
| 7,568,722 | B2 * | 8/2009 | Sato et al. | ................ 280/728.2 |
| 7,581,751 | B2 * | 9/2009 | Ochiai et al. | ............. 280/730.2 |
| 7,597,349 | B2 * | 10/2009 | Ochiai et al. | ............. 280/730.2 |
| 2007/0029765 | A1 * | 2/2007 | Ochiai et al. | ............. 280/730.2 |
| 2007/0046000 | A1 * | 3/2007 | Sato et al. | ................ 280/730.2 |
| 2007/0170705 | A1 | 7/2007 | Lindemann et al. | |

FOREIGN PATENT DOCUMENTS

| | | |
|---|---|---|
| CN | 1845840 | 10/2006 |
| JP | 3750576 | 12/2005 |
| WO | 2005/090132 | 9/2005 |

* cited by examiner

*Primary Examiner*—Paul N Dickson
*Assistant Examiner*—Nicole Verley
(74) *Attorney, Agent, or Firm*—Rankin, Hill & Clark LLP (57) ABSTRACT

In a mounting structure for an airbag apparatus (5) mounted in a vehicle door (3), a holding member 59 provided with an opening end 58 to hold an airbag 78 in a folded state, and a lining member 82 provided at the vehicle interior side of the door 3 are provided, in which the lining member 82 is made in contact with and integrated with the holding member 59 so as to cover the opening end 58 to form an airbag module 128 and is mounted to door panels 13, 14. In accordance with the present invention, it is possible to provide the mounting structure for the airbag apparatus which enables mounting operations and controlling in mounting accuracy of the lining member to be easy and which enables the prevention of deformations from occurring when mounting the lining member.

18 Claims, 4 Drawing Sheets

MOUNTING STRUCTURE FOR AIRBAG APPARATUS

BACKGROUND OF THE INVENTION

1. Field of the Invention

The present invention relates to a mounting structure for an airbag apparatus which is mounted on a door of a vehicle.

Priority is claimed on Japanese Patent Application No. 2007-052603 and Japanese Patent Application No. 2007-052605 filed on Mar. 2, 2007, the contents of which are incorporated herein by reference.

2. Description of Related Art

In the ease of a vehicle collision or the like, a door mounted airbag apparatus which protects passengers by deploying an airbag mounted in a door along the inner surface of the window is known. As a mounting structure to mount such an airbag apparatus in a door panel, a structure is known in which a bracket is fixed in the door panel to form an opening end opening upward together with the door panel, the airbag being held in a folded state in the door panel and the bracket, and the opening end of the door panel and the bracket being covered by a lining member which is provided in the door on the side of the vehicle interior (for example, refer to Patent Document 1). In this structure, since it is necessary for the airbag to push and open the lining member when the airbag deploys, a hinge portion which is fragile and easy to be deformed is provided in the lining member to ease deployment. The portion which coves the opening end of the lining member is formed to be rotatable about the hinge portion. The hinge portion can instead be formed in an upper side formation portion which faces upward. A supporting portion which supports the lining member upwardly and laterally is provided in a lateral side formation portion which is provided facing laterally to the lining member. The lateral direction is the direction perpendicular to the longitudinal direction (front to back direction) of the vehicle.

Patent Document 1: Japanese Patent No. 3750576

With the above-described structure, it has been necessary to mount the airbag apparatus between the bracket and the door panel after mounting the bracket in the door panel and the lining member had to be mounted in the big door panel in this state. It has been known to be a problem because the mounting operation is complicated and also it is not easy to control the mounting accuracy. Also, there has been a possibility such that when the lining member is mounted in the door, if a load is applied to the fragile hinge portion, it deforms and a crease or the like is made.

Therefore, the object of the present invention is to provide a mounting structure for an airbag apparatus in which the mounting operation of the lining member and the control of the mounting accuracy are easy and which is also capable of preventing deformations during the mounting operation of the lining member.

Also, if the hinge is provided in the upper side formation portion, there is a possibility that a lid portion which rotates about the binge portion of the lining member is narrow during deployment of the airbag and it is not possible to smoothly perform deployment of the airbag. Also, if the supporting portion which supports the lining member downwardly is provided in the lateral side formation portion of the lining members it is possible to deform the lining member even in a normal state when a load is applied to the upper side formation portion.

Therefore, the other object of the present invention is to provide a mounting structure for an airbag apparatus in which when a load is applied to the upper side formation portion of the lining member in a normal state, it is possible to prevent deformation and also it is possible to smoothly perform deployment of the airbag by widely opening the lining member during deployment of the airbag.

SUMMARY OF THE INVENTION

In order to achieve the above described objectives, a first aspect of the present invention is a mounting structure of an airbag apparatus (for example, an airbag apparatus 5 in a first embodiment) mounted in a vehicle (for example, a vehicle 1 in the first embodiment) door (for example, a door 3 in the first embodiment), in which a holding member (for example, a holding member 59 in the first embodiment) which has an opening end (for example, an opening end 58 in the first embodiment) and holds the airbag (for example, an airbag 78 in the first embodiment) in a folded state, and a lining member (for example, an upper lining member 82 in the first embodiment) which is provided in the door on the side of the vehicle interior are provided, and in which the lining member is mounted in a door panel (for example, an inner panel 13, an inner side reinforcing panel 14 in the first embodiment) with the lining member made in contact with and integrated with the holding member so as to cover the opening end.

In accordance with the first aspect of the present invention, the lining, member is made to contact and integrate with the holding member so as to cover the opening end of the holding member, that is, the lining member is modularized. The lining member is mounted in the door panel in this modularized state. In this way, by modularizing the relatively small lining member and the holding member by assembling, it is possible to perform the mounting operation of the lining member and the control of the mounting accuracy with ease. Accordingly, it is possible to reduce the cost of operations and it is also possible to prevent foreign materials from entering the lining member from the edge portion thereof which occurs relating to a default in mounting accuracy thereof. Also, as a method of modularizing, the lining member is made to contact with the holding member, therefore it is possible to mount the lining member, in a state of being reinforced by the holding member, to the door panel. Accordingly, it is possible to mount the lining member, in a state of rigidity thereof increased and shape thereof stabilized, to the door panel, whereby it is possible to prevent a crease or the like from being formed which is stemming from deformation or the like which occurs during mounting.

A second aspect of the present invention is that, in the first aspect of the present invention, the lining member and the holding member are provided with vertical contacting portions (for example, vertical contacting portions 123, 124 in the first embodiment) which receive a load from above.

In accordance with the second aspect of the present invention, since the lining member and the holding member are provided with vertical contacting portions which receive a load from above, it is possible to increase the rigidity with regard to deformations which occur especially by a load from above, it is possible to increase mounting accuracy due to positioning between the lining member and the holding member in the vertical direction.

A third aspect of the present invention is that, in the first or the second aspect of the present invention, the lining member and the holding member are provided with lateral contacting portions (for example, lateral contacting portions 126, 127 in the first embodiment) which receive a load laterally.

In accordance with the third aspect of the present invention, since the lining member and the holding member are provided with the lateral contacting portions which receive a load laterally, it is possible to increase rigidity with regard to deformations which occur especially from a lateral load. It is also possible to increase the mounting accuracy due to being positioned between the lining member and the holding member in the lateral direction.

A fourth aspect of the present invention is that, in any one of the first to the third aspects of the present invention, one end of the upper side portion of the lining member is covered by a sealing member, and the lining member and the sealing member (for example, an inner weather-strip 47 in the first embodiment) are sandwiched by the holding member and the door panel.

In accordance with the fourth aspect of the present invention, since the lining member and the sealing member are sandwiched by the holding member and the door panel, it is possible to prevent space from existing between the sealing member and the lining member. Therefore, it is possible to prevent foreign materials from entering thereinto and it is also possible to improve appearance.

A fifth aspect of the present invention is that, in any one of the first to the fourth aspects of the present invention, a connecting portion (for example, a connecting portion 131 in the first embodiment), which connects the lining member, is provided on the side opposing the opening end of the holding member.

In accordance with the fifth aspect of the present invention, since the connecting portion, which connects the lining member, is provided on the side opposing the opening end of the holding member, it is possible to reliably integrate the lining member and the holding member by the connecting portion. It is also possible to connect the lining member to the holding member without causing any influences on deployment direction of the airbag.

A sixth aspect of the present invention is that, in any one of the first to fifth aspects of the present invention, a secondary lining member (for example, a lining main body member 81 in the first embodiment), which is disposed so as to sandwich the lining member with the holding member, is provided.

In accordance with the sixth aspect of the present invention, since the secondary lining member, which is disposed so as to sandwich the lining member with the holding member, is provided, it is also possible to position the secondary lining member.

A seventh aspect of the present invention is a mounting structure of an airbag apparatus (for example, the airbag apparatus 5 in the first embodiment) mounted in a vehicle (for example, the vehicle 1 in the first embodiment) door (for example, the door 3 in the first embodiment), in which a holding member (for example, the holding member 59 in the first embodiment) which holds the airbag (for example, the airbag 78 in the first embodiment) in a folded state, and a lining member (for example, an upper lining member 82 in the first embodiment) disposed in the door at the inner side of a vehicle interior so as to cover the holding member having an upper side formation portion (for example, an upper side formation portion 118 in the first embodiment) disposed facing upward and a lateral side formation portion (for example, an upper intermediate plate portion 102 in the first embodiment) disposed facing laterally are provided, in which a lower supporting portion (for example, the vertical contacting portions 123, 124 in the first embodiment) to support the upper side formation portion of the lining member from below is provided between the holding member and the lining member, and a hinge portion (for example, the hinge portion 120 in the first embodiment) is provided in the lateral side formation portion of the lining member.

In accordance with the seventh aspect of the present invention, since the lower supporting portion which supports from below the upper side formation portion, which is disposed facing upward of the lining member, is provided between the holding member and the lining member, it is possible to prevent deformations when a load is applied to the upper side formation portion of the lining member in a normal state. Also, since the hinge portion is provided in the lateral side formation portion disposed facing laterally to the lining member, it is possible to open the lining member widely during deployment of the airbag and it is possible to perform deployment smoothly.

An eighth aspect of the present invention is that, in the seventh aspect of the present invention, lateral supporting portions (for example, lateral contacting portions 126, 127 in the first embodiment), which support the lateral side formation portion laterally, are provided between the holding member and the lining member.

In accordance with the eighth aspect of the present invention, since lateral supporting portions, which support the lateral side formation portion laterally, are provided between the holding member and the lining member, it is possible to prevent deformations when a load is applied to the lateral side formation portion of the lining member in a normal state.

A ninth aspect of the present invention is that, in the seventh or the eighth aspects of the present invention, the lateral supporting portions are provided in the lining member and also the hinge portion is provided in the vicinity of the end portion of the lateral supporting portions.

In accordance with the ninth aspect of the present invention, the lateral supporting portions are provided in the lining member and also the hinge portion is provided in the vicinity of the end portion of the lateral supporting portions, it is possible to stabilize the deforming position of the hinge portion due to the difference in the rigidity between the lateral supporting portions with relatively high rigidity and the hinge portion with relatively low rigidity, and it is possible to favorably rotate the lid portion of the lining member about the hinge portion where the lateral supporting portions stably support the lining member.

DETAILED DESCRIPTION OF THE INVENTION

A mounting structure for an airbag apparatus in accordance with a first embodiment of the present invention shall be described with reference to the drawings.

Figure 1:
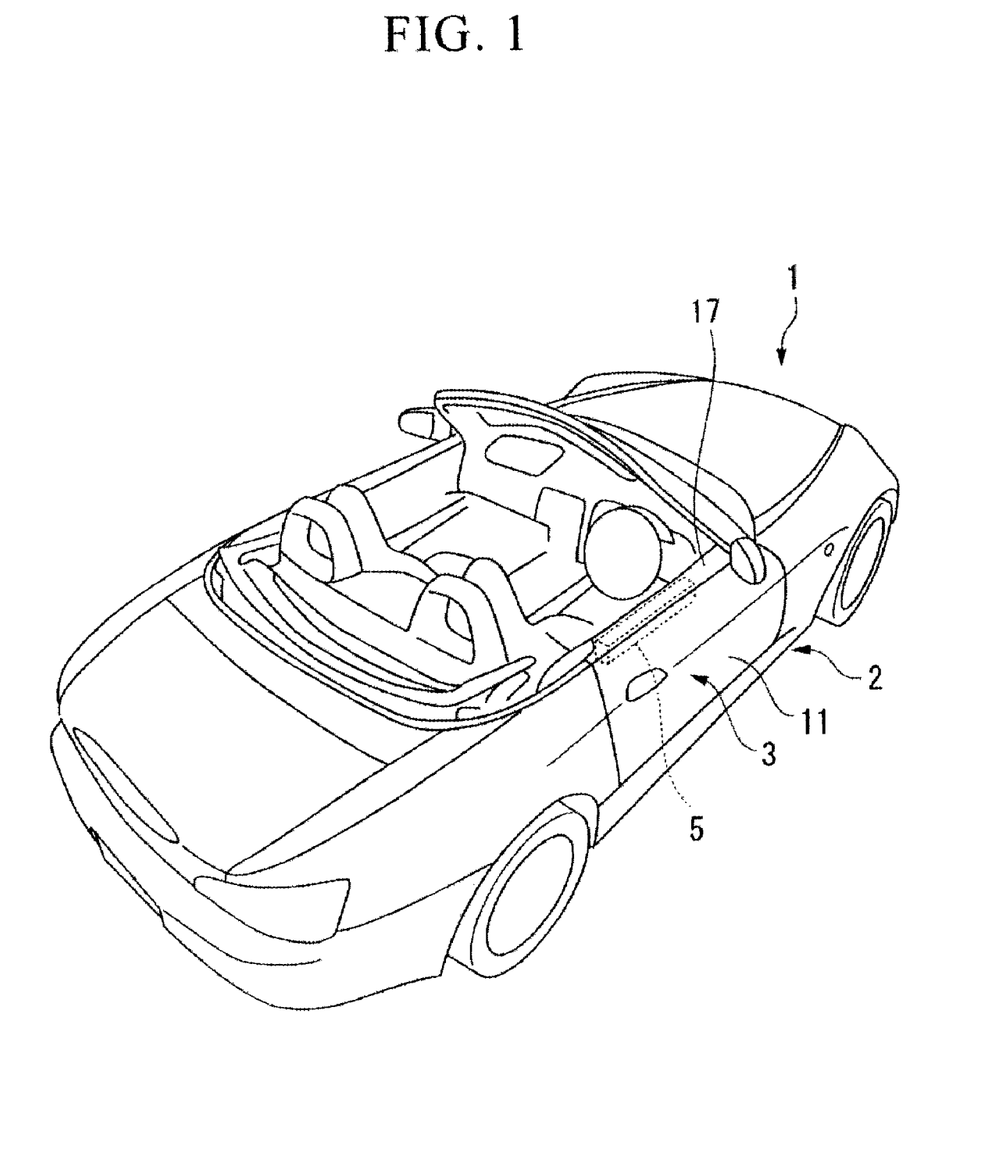
FIG. 1 is a perspective view that shows a vehicle in which a mounting structure for an airbag apparatus in accordance with one embodiment of the present invention is applied.

FIG. 1 shows a four wheel vehicle 1. This vehicle 1 is a convertible, in which the roof thereof can be opened and closed or is detachable. An airbag apparatus 5 is provided in a door 3 which is provided on a side of the vehicle body 2.

Here, descriptions shall be given taking a state, in which the door 3 is closed, as an example.

Figure 2:
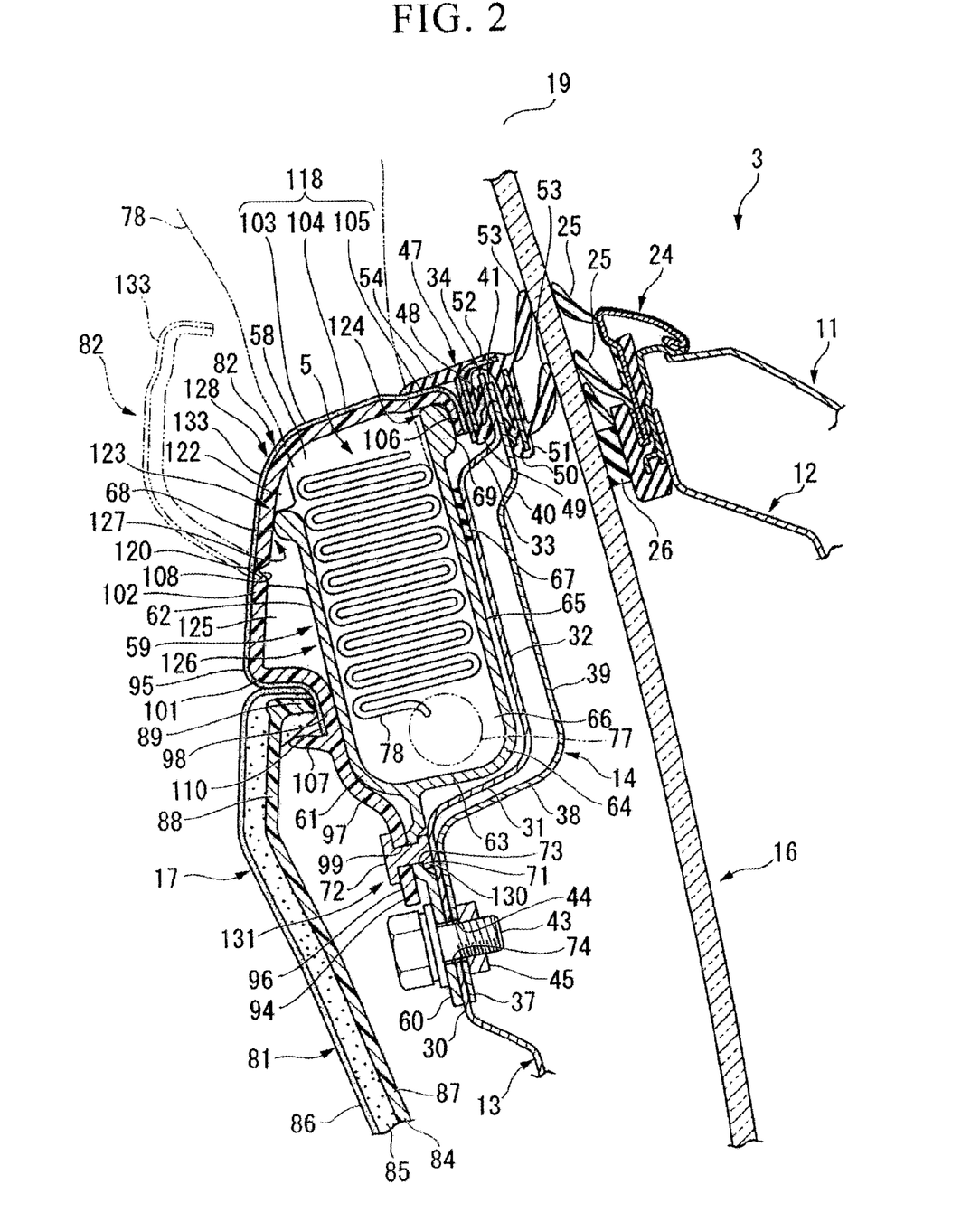
FIG. 2 is a cross-sectional view that shows a mounting structure for an airbag apparatus in accordance with one embodiment of the present invention.

FIG. 2 shows a cross section of the upper portion of the door 3 in detail. As shown in FIG. 2, the door is provided with a metal outer panel 11 which is disposed at an outer side of the vehicle interior along the longitudinal direction of the vehicle to form a design surface of the outer side of the vehicle interior, a metal outer reinforcing panel 12 which reinforces the upper portion of the outer panel 11, a metal inner panel (door panel) 13 which is disposed at the inner side of the vehicle interior from the outer panel 11 along the longitudinal direction of the vehicle, and a metal inner reinforcing panel (door panel) 14 which reinforces the upper portion of the inner panel 13. Also, the door 3 is provided with a window glass 16, which is movable upward and downward, disposed between the combination of outer panel 11 and outer reinforcing panel 12 and the combination of the inner panel 13 and the inner reinforcing panel 14 along the longitudinal direction of the vehicle and capable of extending upward from them, and door lining 17 which covers the inner side of the vehicle interior from the inner panel 13 to form a design surface of the inner side of the vehicle interior.

Here, a window 19 is formed on the upper side of the outer panel 11, the outer reinforcing panel 12, the inner panel 13, the inner reinforcing panel 14, and the door lining 17. The window 19 is opened and closed by the movement upward and downward of the window glass 16 which forms a part of the window 19. The outer panel 11 of metal, the outer reinforcing panel 12, the inner panel 13, and the inner reinforcing panel 14 are high rigidity portions of the door 3 which form a portion of the vehicle body 2.

The outer panel 11 forms a design surface of the outer side of the vehicle interior, and the outer reinforcing panel 12 is connected to the inner side of the vehicle interior from the outer panel 11. An outer weather-strip 24, which extends in the longitudinal direction of the vehicle and seals spacing between the window glass 16, is mounted so as to connect the upper portions of the outer panel 11 and the outer reinforcing panel 12. Here, the outer weather-strip 24 performs sealing by contacting the window glass 16 by a plurality of vertical tongue pieces 25 and a substantially square bar-shaped sealing member 26.

On the upper portion of the inner panel 13, an inner plate portion 30 placed on the inner side of the vehicle interior, a step plate portion 31 extending toward the outer side of the vehicle interior from the upper edge portion of the inner plate portion 30, an intermediate plate portion 32 extending slightly diagonally upward toward the inner side of the vehicle interior from an outer edge portion in the outer side in the vehicle width direction of the step plate portion 31, a step plate portion 33 extending toward the outer side of the vehicle interior from the upper edge portion of the intermediate plate portion 32, and an upper plate portion 34 extending slightly diagonally upward toward the inner side of the vehicle interior from an outer edge portion in the outer side in the vehicle width direction of the step plate portion 33 are provided. On the outer side of the vehicle interior of the upper portion of the inner panel 13, the inner reinforcing panel 14 is connected.

The inner reinforcing panel 14 is provided with an inner plate portion 37 connected to the outer side of the vehicle interior of the inner plate portion 30 of the inner panel 13, a step plate portion 38 extending toward the outer side of the vehicle interior from the upper edge portion of the inner plate portion 37, an intermediate plate portion 39 extending slightly diagonally upward toward the inner side of the vehicle interior from an outer edge portion in the outer side in the vehicle width direction of the step plate portion 38, a step plate portion 40 extending toward the outer side of the vehicle interior from the upper portion of the intermediate plate portion 39, an upper plate portion 41 extending slightly diagonally upward toward the inner side of the vehicle interior from an outer edge portion in the outer side in the vehicle width direction of the step plate portion 40 as well as being connected to the outer side of the vehicle interior from the upper plate portion 34 of the inner panel 13. Accordingly, inner panel 13 and the inner reinforcing panel 14 form a closed cross sectional structure.

Here, in the inner plate portion 30 of the inner panel 13 and the inner plate portion 37 of the inner reinforcing panel 14 which are connected with each other, a plurality of mounting holes 44 is formed with intervals in the longitudinal direction of the vehicle which penetrates therethrough to let mounting bolts penetrate therethrough (in FIG. 2, only one of them is shown). A weld nut 45 is fixed on the outer side of the vehicle interior of the inner plate portion 37 of the inner reinforcing panel 14 by positioning with the mounting holes 44.

In the connecting portion between the upper plate portion 34 of the inner panel 13 and the upper plate portion 41 of the inner reinforcing panel 14, an inner weather-strip (scaling member) 47 which seals spacing between the window glass 16 is mounted so as to sandwich the upper plate portions 34 and 41. The inner weather-strip 47 is provided with a sandwiching piece portion 49 disposed on the inner side of the vehicle interior from the upper plate portion 34 having a plurality of locking tongue pieces 48 extending toward the outer side of the vehicle interior, a sandwiching piece portion 51 disposed on the outer side of the vehicle interior from the upper plate portion 41 having a plurality of locking tongue pieces 50 extending toward the inner side of the vehicle interior, and a connecting portion 52 which connects the upper portions of the sandwiching piece portions 49 and 51. The sandwiching piece portions 49 and 51 sandwich the upper plate portions 34 and 41. The inner weather-strip 47 is also provided with a plurality of vertical sealing tongue pieces 53 extending toward the direction of the window glass 16 from the sandwiching piece portion 51 to contact the window glass 16, and a contacting tongue piece 54 extending toward the inner side of the vehicle interior forming an approximately identical surface to the connecting portion 52.

On the inner side of the vehicle interior from the inner panel 13, a metal holding member 59, which is provided with an opening end 58 opening upward and extending in the longitudinal direction of the vehicle is provided. An airbag apparatus 5 is housed inside of the holding member 59. The holding member 59 is provided with a substantially flat plate-shaped connecting plate portion 60 connected to the inner side of the vehicle interior of the inner plate portion 30 of the inner panel 13, an inner curved plate portion 61 extending diagonally upward from the inner side of the vehicle interior and being curved from the upper edge portion of the connecting plate portion 60, an inner holding plate portion 62 formed as a flat plate-shape extending slightly diagonally upward toward the inner side of the vehicle interior from the upper edge portion of the inner curved plate portion 61, a bottom plate portion 63 formed as a flat plate-shape extending toward the outer side of the vehicle interior from the upper edge portion of the connecting plate portion 60, outer curved plate portion 64 extending diagonally upward toward the outer side of the vehicle interior and being curved from the upper edge portion of the bottom plate portion 63, an outer holding plate portion 65 formed as a flat plate-shape extending slightly diagonally upward toward the inner side of the vehicle interior from the upper edge portion of the outer curved plate portion 64. The inner holding plate portion 62 and the outer holding plate portion 65 are parallel to each other. The airbag apparatus 5 is mounted in a housing space 66 which is surrounded by the inner holding plate portion 62, the outer holding plate portion 65, the inner curved plate portion 61, the outer curved plate portion 64, and the bottom plate portion 63. A space between the upper end portions of the outer holding plate portion 65 and the inner curved plate portion 61 forms the opening end 58 of the housing space 66. Here, a cushion member 67 of substantially square rod-shape is attached to the outer side of the vehicle interior of the outer holding plate portion 65.

Here in the holding member 59, a protruding portion 68 protruding to the inner side of the vehicle interior is formed extending in the longitudinal direction of the vehicle at the upper end portion of the inner holding plate portion 62, and a protruding portion 69 protruding to the outer side of the vehicle interior is formed extending in the longitudinal direction of the vehicle at the upper end portion of the outer holding plate portion 65. Accordingly, the upper portions of the inner holding plate portion 62 and the outer holding plate portion 65 are formed thicker than other portions. Additionally, on the upper portion of the connecting plate portion 60 of the holding member 59, a plurality of concaved portions 71 formed to be concaved to the inner side of the vehicle interior is formed (in FIG. 2, only one of them is shown) with intervals in the longitudinal direction of the vehicle, and mounting holes 73 are formed to penetrate in the vehicle width direction in each of the concaved portions 71 to pass through rivets 72. Furthermore, in the lower portion of the connecting plate portion 60, a plurality of mounting holes 74, which penetrates in the vehicle width direction to pass through the bolts 43 for mounting to the inner plate portion 30 of the inner panel 13 and the inner plate portion 37 of the inner reinforcing panel 14, is formed with intervals in the longitudinal direction of the vehicle (in FIG. 2, only one of them is shown).

The airbag apparatus 5 is provided with an inflator 77 disposed in the lower portion of the housing space 66 of the holding member, and the airbag 78 folded back so as to be accumulated in series upward from the inflator 77.

The door lining 17 is provided with a lining main body member (a secondary lining member) 81 forming an intermediate to the lower portions of the door lining 17 extending in longitudinal direction of the vehicle, and an upper lining member 82 disposed between the lining main body member 81 and the inner weather-strip 47 extending in the longitudinal direction of the vehicle.

The upper portion of the lining main body member 81 is formed by the inner side of the vehicle interior of the lining core member 84 of relatively hard material which is a casting product being covered by a lining base member 85 of relatively soft material and the inner side and upper side of the vehicle interior of the lining base member 85 being covered by a surface skin member 86. Here, the upper portion of the lining main body member 81 is provided with an intermediate plate portion 87 having a flat plat shape extending slightly diagonally toward the inner side of the vehicle interior as closer to the upper side thereof, an upper plate portion 88 having a flat plat shape extending slightly diagonally upward toward the outer side of the vehicle interior from the upper edge portion of the intermediate plate portion 87, and a protruding plate portion 89 protruding to the outer side of the vehicle interior from the upper edge portion of the upper plate portion 88. The protruding plate portion 89 is formed to have a tapered shape with its lower surface being sloped.

The upper lining member 82 is formed such that a predetermined range and the upper side of the inner side of the vehicle interior of the lining core member 94 of relatively hard material which is a casting product is covered by a surface skin member 95. The upper lining member 82 is provided with a connecting plate portion 96 which is connected to the connecting plate portion 60 of the holding member 59 and a lower curved plate portion 97 extending and being curved toward the inner and upper sides of the vehicle interior from the upper edge portion of the connecting plate portion 96. Here, the connecting plate portion 96 and the lower curved plate portion 97 are made only from the lining core member 94. In the connecting plate portion 96, a plurality of mounting holes 99 is formed with intervals in the longitudinal direction of the vehicle penetrating in the vehicle width direction in which the rivet 72 is passed through (in FIG. 2, only one of them is shown).

The upper lining member 82 is provided with a lower intermediate plate portion 98 having a flat plate shape extending slightly diagonally upward toward the inner side of the vehicle interior from the upper edge portion of the lower curved plate portion 97, an inner extending plate portion 101 extending toward the inner side of the vehicle interior from the upper edge portion of the inner extending plate portion 101, an upper intermediate plate portion (lateral side formation portion) 102 having a flat plate shape extending slightly diagonally upward toward the outer side of the vehicle interior from the inner edge portion of the inner extending plate portion 101, an upper curved plate portion 103 extending and being curved upward toward the outer side of the vehicle interior from the upper edge portion of the upper intermediate plate portion 102, an upper plate portion 104 having a flat plate shape extending toward the outer side of the vehicle interior from the outer edge portion of the upper curved plate portion 103, a step plate portion (upper side portion) 105 extending toward the outer side of the vehicle interior forming a step shape with regard to the upper surface of the upper plate portion 104 from the outer edge portion at the outer side of the vehicle interior of the upper plate portion 104, a downward protruding plate portion 106 extending downward slightly diagonally toward the outer side of the vehicle interior from the outer edge portion at the outer side of the vehicle interior of the step plate portion 105. Here, the lower intermediate plate portion 98, the inner edge portion of the inner extending plate portion 101, the upper intermediate plate portion 102, the upper curved plate portion 103, the upper plate portion 104, the step plate portion 105, and the downward protruding plate portion 106 are made from the lining core member 94 and the surface skin member 95.

In the core lining member 94 of the upper lining member 82, a protruding plate portion 107 protruding to the inner side of the vehicle interior from the upper edge position of the lower curved plate portion 97 is formed. Also, in the core lining member 94 of the upper lining member 82, a groove 108 concaving in a V shape to the inner side of the vehicle interior from the outer side surface of the vehicle interior at an intermediate predetermined position of the upper intermediate plate portion 102 is formed.

Here, the upper curved plate portion 103, the upper plate portion 104, and the step plate portion 105 of the upper lining member 82 form the upper side formation portion 118 disposed facing upward and the upper intermediate plate portion 102 is disposed facing in the lateral direction In the upper lining member 82, the vicinity of the bottom portion of the groove 108 formed in the upper intermediate plate portion 102 is made as a fragile portion which becomes a hinge portion 120 bending about an axis being in parallel to the longitudinal direction of the vehicle during deployment of the airbag apparatus 5.

At the outer side of the vehicle interior of the upper curved plate portion 103, a plurality of upper reinforcing plate portions (vertical contacting portion) 122 perpendicular to the longitudinal direction of the vehicle is formed in the lining core member 94 (in FIG. 2, only one of them is shown). The upper reinforcing plate portions 122 are formed such that the lower side surface thereof is in contact with the upper surface of the upper edge portion of the inner holding plate portion 62 of the holding member 59. The upper reinforcing plate portions 122 and the inner holding plate portion 62 are provided in the upper lining member 82 and the holding member 59 so as to form a vertical contacting portion (lower supporting portion) 123 to receive a load from above in other words, the vertical contacting portion 123 is located between the upper lining member 82 and the holding member 59 to support the upper side formation portion 118 of the upper lining member 82 from below.

The lower surface of the step plate portion 105 of the upper lining member 82 is formed to be in contact with the upper edge surface of the outer holding plate portion 65 of the holding member 59. The outer holding plate portion 65 and the step plate portion 105 are provided in the upper lining member 82 and the holding member 59 so as to form a vertical contacting portion (lower supporting portion) 124 to receive a load from above. In other words, the vertical contacting portion 124 is located between the upper lining member 82 and the holding member 59 to support the upper side formation portion 118 of the upper lining member 82 from below.

In the core lining member 94, from the vicinity of the groove 108, more specifically from the lower side position of the groove 108 of the upper intermediate plate portion 102 to the inner extending plate portion 101, a plurality of lower reinforcing plate portions (lateral contacting portion) 125 perpendicular to that location (in other words, perpendicular to the longitudinal direction of the vehicle) are formed at intervals in the longitudinal direction of the vehicle (in FIG. 2, only one of them is shown). The lower reinforcing plate portions 125 are formed so that the surface thereof at the outer side of the vehicle interior is in contact with a surface which is located at the vehicle interior side of the inner holding plate portion 62 of the holding member 59. The lower reinforcing plate portions 125 and the inner holding plate portion 62 are provided in the upper lining member 82 and the holding member 59 so as to form a lateral contacting portion (lateral supporting portion) 126 to receive a lateral load. In other words, the lateral contacting portion 126 is located between the upper lining member 82 and the holding member 59 to support the upper lining member 82 laterally. The hinge portion 120 is provided in the vicinity of the upper edge portion of the lower reinforcing plate portion 125 which is provided in the upper lining member 82 and which forms the lateral contacting portion 126 thereof.

On a surface at the outer side of the vehicle interior just below the upper reinforcing plate portions 122 at the upper intermediate plate portion 102 of the upper lining member 82 is formed so as to be in contact with a surface located at the vehicle interior side of the protruding portion 68 of the inner holding plate portion 62 of the holding member 59. The upper intermediate plate portion 102 and the protruding portion 68 are provided in the upper lining member 82 and the holding member 59 so as to form a lateral contacting portion (lateral supporting portion) 127 to receive a lateral load. In other words, the lateral contacting portion 127 is located between the upper lining member 82 and the holding member 59 to support the upper lining member 82 laterally.

The airbag apparatus 5 including the airbag 78 in a folded state is disposed in arbitral position inside the housing space 66 of the holding member 59. In this state, the holding member 59 is covered by the upper lining member 82 so as to cover the opening end 58 of the holding member 59. Rivets 72 are passed through the mounting holes 99 of the upper lining member 82 and the mounting holes 73 of the holding member 59. By caulking rivets 72 and integrating the upper lining member 82 and the holding member 59, airbag module 128 is formed.

By modularizing in this way, a surface at the vehicle interior side of the downward protruding plate portion 106 of the upper lining member 82 is in contact with a surface at the vehicle exterior side of the protruding portion 69 of the outer holding plate portion 65 of the holding member 59 and the lower surface of the step plate portion 105 is in contact with the upper edge surface of the outer holding plate portion 65. The lower surface of the upper reinforcing plate portions 122 is in contact with the upper edge surface of the inner holding plate portion 62 of the holding member 59. A surface at the vehicle exterior side in the vicinity more specifically below the upper reinforcing plate portions 122 which is above the hinge portion 120 of the upper intermediate plate portion 102 is in contact with a surface at the vehicle interior side of the protruding portion 68 of the inner holding plate portion 62 of the holding member 59. A surface at the vehicle exterior side of the lower reinforcing plate portion 125 and a surface making a continuous surface at the vehicle exterior side of the lower intermediate plate portion 98 are in contact with a surface at the vehicle interior side of the inner holding plate portion 62 of the holding member 59. A curved surface of the lower curved plate portion 97 facing the vehicle exterior side diagonally upward is in contact with a curved surface of the inner curved plate portion 61 of the holding member 59 facing the vehicle interior side diagonally downward. Accordingly, the connecting plate portion 96 is in contact with the connecting plate portion 60. On the opposite side from the opening end 58 of the holding member 59, a connecting portion 131, which is formed from the rivets 72 which connects the upper lining member 82, the mounting holes 73 and 99, and the connecting plate portions 60 and 96, is provided. Here, the rivets 72 are caulked such that a caulking formation portion 130 at the side of the concaved portion 71 is housed inside tie concaved portion 71. The concaved portion 71 is formed by caulking.

Next, the airbag module 128 produced and prepared as described above is mounted to the vehicle interior side of the inner panel 13 by tightening the bolts 43, which is passing through the mounting holes 74 and the mounting holes 44 of the inner panel 13 and the inner reinforcing panel 14 from the inner side of the vehicle interior, with the weld nuts 45. In this state of the airbag module 128, the connecting panel portion 60 of the holding member 59 is in contact with the inner plate portion 30 of the inner panel 13 and the cushion member 67 disposed in the outer holding plate portion 65 of the holding member 59 is in contact with the intermediate plate portion 32 of the inner panel 13.

In this way, when the airbag module 128 is mounted to the inner panel 13, the lining main body member 81 is mounted to the inner panel 13. At this moment, the protruding plate portion 89 of the lining main body member 81 is fit to a space between the inner extending plate portion 101 and the protruding plate portion 107 of the airbag module 128. As a result, the lining main body member 81 is disposed so as to sandwich the upper lining member 82 with the holding member 59. Due to the protruding plate portion 89 of the lining main body member 81 fitting with the airbag module 128, a reliable combination thereof is assured.

If the airbag module 128 is mounted to the inner panel 13, the inner weather-strip 47 is mounted so that the sandwiching piece portion 49 and the sandwiching piece portion 51 sandwich the upper plate portions 34 and 41. Then, the plurality of vertical sealing tongue pieces 53 extends toward the direction of the window glass 16 from the sandwiching piece portion 51 to make a contact with the window glass 16. The contacting tongue piece 54 extending toward the inner side of the vehicle interior makes contact with and covers the upper side portion of the step plate portion 105 of the upper lining member 82 of the airbag module 128. Accordingly, the plurality of sealing tongue pieces 48 of the inner weather-strip 47 pushes the sandwiching piece portion 49 to the downward protruding plate portion 106 of the upper lining member 82 of the airbag module 128 to sandwich the upper lining member 82 and the inner weather-strip 47 by the holding member 59 and the inner panel 13. By the contacting tongue piece 54 of the inner weather-strip 47; one end at the outer side of the vehicle interior of the upper side formation portion 118 of the upper lining member 82 is covered. Accordingly, fluctuations of spacing between the downward protruding plate portion 106 of the upper lining member 82 and the upper plate portion 34 of the inner panel 13 are absorbed and the spacing is favorably removed.

Figure 3:
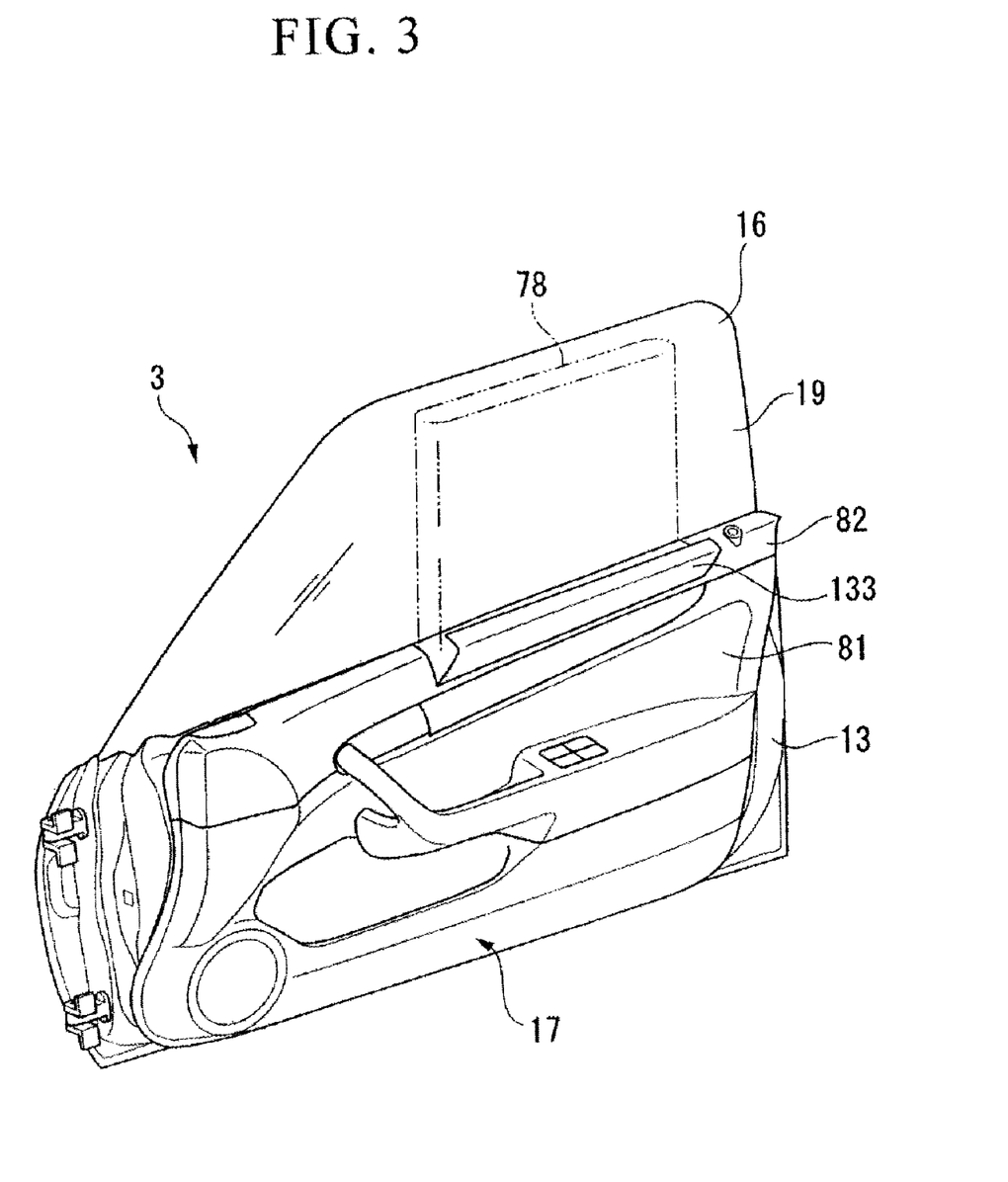
FIG. 3 is a perspective view that shows a door in which a mounting structure for an airbag apparatus in accordance with one embodiment of the present invention is applied.

The airbag apparatus 5 as described above ignites the inflator 77 when deployment conditions such as predetermined acceleration is detected or the like are satisfied in the case of a collision of vehicle, the airbag 78 inflates by gas generated by the inflator 77. Since the airbag 78 is folded back so as to be accumulated in series upward and both sides of which are sandwiched by the inner holding plate portion 62 and the outer holding plate portion 65 of the holding member 59, the airbag inflates and exits upward from the opening end 58 as shown by the dotted line in FIG. 2 guided by the inner holding plate portion 62 and the outer holding plate portion 65. At this moment, the airbag 78 pushes and rotates the upper side formation portion 118 of the upper lining member 82, by breaking the lid portion 133 at the upper side of the hinge portion 120 of the upper lining member 82 by a tear line in the longitudinal direction of the vehicle, toward the vehicle interior side about the hinge portion 120, deploys so as to extend upward along the inner surface of the window glass 16 from the lower side of the window 19 as shown by the doted line in FIG. 3.

In accordance with the first embodiment as described above, the upper lining member 82 is made in contact with and integrated with the holding member 59 so as to cover the opening end of the holding member 59, that is, modularized. In the modularized state, the upper lining member 82 is mounted to the inner panel 13 and the inner reinforcing panel 14. As described above, as a method of modularizing, the relatively small upper lining member 82 and the holding member 59 are combined, therefore it is possible to perform mounting operation of the upper lining member 82 with ease and the control of the mounting accuracy becomes easy. Accordingly, it is possible to reduce the cost of operations and it is also possible to prevent, for example, foreign materials from entering the upper lining member 82 from the edge portion thereof which occurs relating to a default in the mounting accuracy thereof. Also, as a method of modularizing, the upper lining member 82 is made to contact with the holding member 59, therefore it is possible to mount the upper lining member 82 to the inner panel 13 and to the inner reinforcing panel 14 in a state in which the upper lining member 82 is reinforced by the holding member 59. Accordingly, it is possible to mount the upper lining member 82, in a state of rigidity thereof increased and the shape thereof stabilized, to the inner panel 13 and inner reinforcing panel 14, whereby it is possible to prevent a crease or the like from being formed which is stemming from deformation or the like which occurs during mounting.

Also, since the vertical contacting portions 123, 124 to receive a load from above are provided in the upper lining member 82 and the holding member 59, it is possible to increase rigidity with regard to deformations especially by a load from above, it is possible to increase mounting accuracy by positioning in vertical direction the upper lining member 82 and the holding member 59.

Since the lateral contacting portions 126, 127 to receive a load laterally are provided in the upper lining member 82 and the holding member 59, it is possible to increase rigidity with regard to deformations especially by a load from the lateral direction, it is possible to increase the mounting accuracy by positioning the upper lining member 82 and the holding member 59 in lateral direction.

By sandwiching the upper lining member 82 and the inner weather-strip 47 by the holding member 59 and the inner panel 13, it is possible to prevent spacing between the inner weather-strip 47 and the upper lining member 82. Accordingly, it is possible to prevent foreign materials from entering and it is possible to improve appearance.

Since the connecting portion 131 for connecting the upper lining member 82 is provided to the opposite side of the opening end 58 of the holding member 59, it is possible to reliably integrate the upper lining member 82 with the holding member 59 by the connecting portion 131 It is also possible to connect the upper lining member 82 to the holding member 59 without giving any influences to deployment direction of the airbag 78.

Since the lining main body member 81 is provided so as to sandwich the upper lining member 82 with the holding member 59, it is also possible to position the lining main body member 81.

The edge of the upper lining member 82 is the downward protruding plate portion 106 bending downward. It is possible to further prevent foreign materials from entering the housing space 66 and it is also possible to make the appearance of the edge preferable.

Since the vertical contacting portions 123, 124 from below the upper side formation portion 118, which is disposed facing the upper direction of the upper lining member 82, is provided between the holding member 59 and the upper lining member 82, it is possible to prevent deformation from occurring when a load is applied from below to the upper side formation portion 118 of the upper lining member 82 in a normal state. Also, since the hinge portion 120 is provided in the upper intermediate plate portion 102 which is disposed facing the lateral side of the upper lining member 82, it is possible to smoothly perform deployment by widely opening the lid portion 133 of the upper lining member 82 during deployment of the airbag 78.

Since the lateral contacting portions 126, 127 supporting the upper intermediate plate portion 102 from the lateral direction are provided between the holding member 59 and the upper lining member 82, it is possible to prevent deformation from occurring when a load is applied from the lateral direction to the upper intermediate plate portion 102 of the upper lining member 82 in a normal state.

Since the lower reinforcing plate portion 125 which forms the lateral contacting portion 126 is provided in the upper lining member 82 and the hinge portion 120 is provided in the vicinity of the edge portion thereof, it is possible to stabilize the deforming position of the hinge portion 120 due to the difference in the rigidity between the lateral supporting portion 126 with relatively high rigidity and the hinge portion 120 with relatively low rigidity, and it is possible to favorably rotate the lid portion 133 located above the hinge portion 120 of the upper lining member 82 about the hinge portion 120 in a state in which the lateral supporting portion 126 stably supports below the binge portion 120 of the upper lining member 82.

Figure 4:
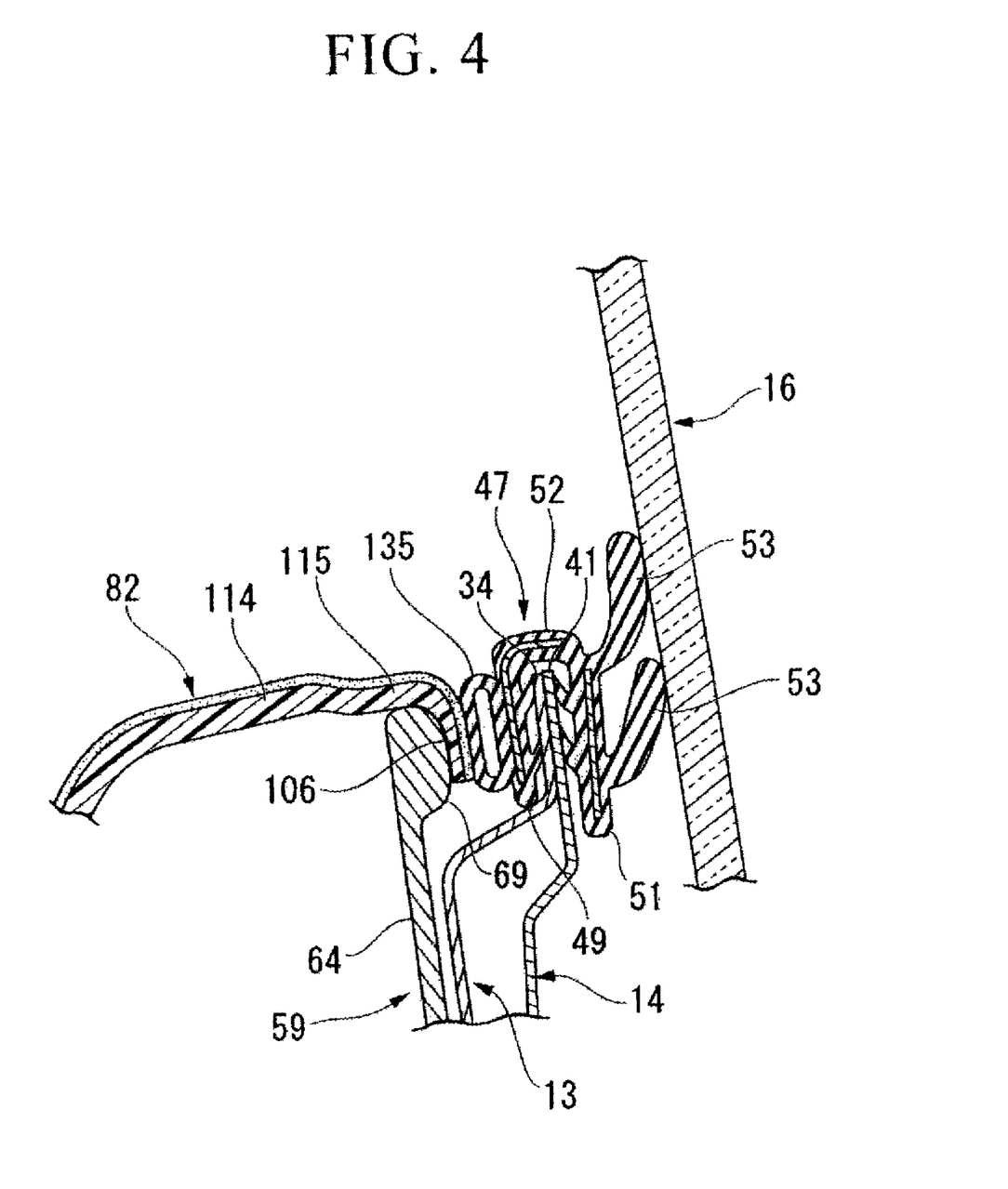
FIG. 4 is a cross-sectional view that shows an alternate example of an inner weather-strip of a mounting structure for an airbag apparatus in accordance with one embodiment of the present invention.

Here, in the above described first embodiment, as shown in FIG. 4, the inner weather-strip 47 may be formed such that a hollow sealing member 135 is provided instead of the contacting tongue piece 54 for absorbing fluctuations of spacing existing between the downward protruding plate portion 106 of the upper lining member 82 and the upper plate portion 34 of the inner panel 13 to eliminate the spacing.

Next, a mounting structure for an airbag apparatus in accordance with a second embodiment of the present invention shall be described with reference to the drawings.

Note that portions similar to those in the first embodiment shall be given the same reference numerals and explanations thereof shall be omitted here.

In accordance with the second embodiment of the present invention, since the vertical contacting portions 123, 124 supporting the upper side formation portion 118 from below disposed facing above the upper lining member 82 are provided between the holding member 59 and the upper lining member 82, it is possible to prevent deformations from occurring which occur when a load is applied downward to the upper side formation portion 118 of the upper lining member 82 in a normal state. Also, since the hinge portion 120 is provided in the upper intermediate plate portion 102 disposed facing the lateral side of the upper lining member 82; it is possible to smoothly perform deployment by widely opening the lid portion 133 of the upper lining member 82 during deployment of the airbag 78.

Also, since the lateral contacting portions 126, 127 to laterally support the upper intermediate plate portion 102 are provided between the holding member 59 and the upper lining member 82, it is possible to prevent deformations from occurring when a load is applied laterally to the upper intermediate plate portion 102 of the upper lining member 82 in a normal state.

Since the lower reinforcing plate portion 125 forming the lateral contacting portion 126 is provided in the upper lining member 82 and the hinge portion 120 is provided in the vicinity of the edge portion thereof, due to the difference in the rigidity between the lateral supporting portion 126 with relatively high rigidity and the hinge portion 120 with relatively low rigidity, it is possible to stabilize the deforming position of the hinge portion 120 and it is possible to favorably rotate the lid portion 133 at the upper side of the hinge portion 120 of the upper lining member 82 about the hinge portion 120 in a state in which the lateral contacting portion 126 stably supporting the lower side of the hinge portion 120 of the upper lining member 82.

The upper lining member 82 is made to contact and integrate with the holding member 59 so as to cover the opening end 58 of the holding member 59, that is, the upper lining member 82 is mounted to the inner panel 13 and the inner reinforcing panel 14 in a modularized state. As described above, as a method of modularizing, the relatively small upper lining member 82 and the holding member 59 are combined, therefore it is possible to perform the mounting operation of the upper lining member 82 with ease and the control of the mounting accuracy becomes easy. Accordingly, it is possible to reduce the cost of operations and it is also possible to prevent, for example, foreign materials from entering the opening end 58 which occurs relating to a default in mounting accuracy thereof. Also, as a method of modularizing, the upper lining member 82 are made to contact with the holding member 59, therefore it is possible to mount the upper lining member 82 to the inner panel 13 and to the inner reinforcing panel 14 in a state in which the upper lining member 82 is reinforced by the holding member 59. Accordingly, it is possible to mount the upper lining member 82, with the rigidity thereof increased and the shape thereof stabilized, to the inner panel 13 and inner reinforcing panel 14, whereby it is possible to prevent a crease or the like from being formed which is stemming from deformation or the like which occurs during mounting.

Also, since the vertical contacting portions 123, 124 to receive a load from above are provided in the upper lining member 82 and the holding member 59, it is possible to increase rigidity with regard to deformations occurring especially by a load from above, it is possible to increase the mounting accuracy by positioning the upper lining member 82 and the holding member 59 in the vertical direction.

Since the lateral contacting portions 126, 127 receiving a load laterally are provided in the upper lining member 82 and the holding member 59, it is possible to increase the rigidity with regard to deformations occurring especially by a load from the lateral direction, it is possible to increase the mounting accuracy by positioning the upper lining member 82 and the holding member 59 in the lateral direction.

By sandwiching the upper lining member 82 and the inner weather-strip 47 by the holding member 59 and the inner panel 13, it is possible to prevent spacing from occurring between the inner weather-strip 47 and the upper lining member 82. Accordingly, it is possible to prevent foreign materials from entering and it is possible to improve appearance.

Since the connecting portion 131 for connecting the upper lining member 82 is provided to the opposite side of the opening end 58 of the holding member 59, it is possible to reliably integrate the upper lining member 82 with the holding member 59 by the connecting portion 131, it is possible to connect the upper lining member 82 to the holding member 59 without giving any influences on deployment direction of the airbag 78.

Since the lining main body member 81 is provided so as to sandwich the upper lining member 82 with the holding member 59, it is also possible to position the lining main body member 81.

Since the edge of the upper lining member 82 is the downward protruding plate portion 106 bending downward, it is possible to further prevent foreign materials from entering into the housing space 66 and it is also possible to make the appearance of the edge preferable.

Here, in the above described second embodiment, as shown in FIG. 4, the inner weather-strip 47 may be formed such that a hollow sealing member 135 is provided instead of the contacting tongue piece 54 for absorbing fluctuations of spacing existing between the downward protruding plate portion 106 of the upper lining member 82 and the upper plate portion 34 of the inner panel 13 to eliminate the spacing.

What is claimed is:

1. A mounting structure for an airbag apparatus which is mounted in a door of a vehicle, comprising:
   a holding member having an opening end and holds an airbag in a folded state, and
   a lining member provided at a vehicle interior side of the door,
   wherein the lining member is mounted to a door panel by making contact with and being integrated with the holding member so as to cover the opening end, the lining member is provided at the vehicle interior side of the door so as to cover the holding member, and the lining member is further provided with:
an upper side formation portion disposed facing upward, and
a lateral side formation portion disposed facing a lateral direction, wherein
a lower supporting portion supporting the upper side formation portion of the lining member from below is provided in the holding member.

2. The mounting structure for the airbag apparatus in accordance with claim 1, further comprising:
a hinge portion provided in the lateral side formation portion of the lining member.

3. The mounting structure for the airbag apparatus in accordance with claim 1, further comprising:
lateral supporting portions supporting the lateral side formation portion from the lateral side provided in the holding member.

4. The mounting structure for the airbag apparatus in accordance with claim 1, further comprising:
a vertical contacting portion transmitting a load from above to the holding member provided in the lining member.

5. The mounting structure for the airbag apparatus in accordance with claim 1, further comprising:
a lateral contacting portion transmitting a load from the lateral side to the holding member provided in the lining member.

6. The mounting structure for the airbag apparatus in accordance with claim 5, wherein
a hinge portion is provided in the vicinity of an edge portion of the lateral contacting portion.

7. The mounting structure for the airbag apparatus in accordance with claim 1, wherein
one end of an upper side portion of the lining member is covered by a sealing member, and
the lining member and the sealing member are sandwiched by the holding member and the door panel.

8. The mounting structure for the airbag apparatus in accordance with claim 1, further comprising:
a connecting portion for connecting the lining member provided at the opposite side of the opening end of the holding member.

9. The mounting structure for the airbag apparatus in accordance with claim 1, further comprising:
a secondary lining member provided so as to sandwich the lining member with the holding member.

10. A mounting structure for an airbag apparatus which is mounted in a door of a vehicle, comprising:
a holding member having an opening end and holds an airbag in a folded state,
a lining member provided at a vehicle interior side of the door, and
a vertical contacting portion transmitting a load from above to the holding member provided in the lining member,
wherein the lining member is mounted to a door panel by making contact with and being integrated with the holding member so as to cover the opening end.

11. The mounting structure for the airbag apparatus in accordance with claim 10, wherein
the lining member is provided at the vehicle interior side of the door so as to cover the holding member, and the lining member is further provided with:
an upper side formation portion disposed facing upward, and
a lateral side formation portion disposed facing a lateral direction, wherein
a lower supporting portion supporting the upper side formation portion of the lining member from below is provided in the holding member.

12. The mounting structure for the airbag apparatus in accordance with claim 10, further comprising:
a hinge portion provided in the lateral side formation portion of the lining member.

13. The mounting structure for the airbag apparatus in accordance with claim 10, further comprising:
lateral supporting portions supporting the lateral side formation portion from the lateral side provided in the holding member.

14. The mounting structure for the airbag apparatus in accordance with claim 10, further comprising:
a lateral contacting portion transmitting a load from the lateral side to the holding member provided in the lining member.

15. The mounting structure for the airbag apparatus in accordance with claim 14, wherein
a hinge portion is provided in the vicinity of an edge portion of the lateral contacting portion.

16. The mounting structure for the airbag apparatus in accordance with claim 10, wherein
one end of an upper side portion of the lining member is covered by a sealing member, and
the lining member and the sealing member are sandwiched by the holding member and the door panel.

17. The mounting structure for the airbag apparatus in accordance with claim 10, further comprising:
a connecting portion for connecting the lining member provided at the opposite side of the opening end of the holding member.

18. The mounting structure for the airbag apparatus in accordance with claim 10, further comprising:
a secondary lining member provided so as to sandwich the lining member with the holding member.

* * * * *